(12) United States Patent
Jetzinger et al.

(10) Patent No.: US 8,246,738 B2
(45) Date of Patent: Aug. 21, 2012

(54) THICKENER FOR PAINT SYSTEMS

(75) Inventors: Franz Jetzinger, Tullnerbach (AT); Martin Kozich, Vienna (AT); Marnik Michel Wastyn, Schwechat (AT)

(73) Assignee: Agrana Staerke GmbH, Gmuend (AT)

( * ) Notice: Subject to any disclaimer, the term of this patent is extended or adjusted under 35 U.S.C. 154(b) by 0 days.

(21) Appl. No.: 12/101,248

(22) Filed: Apr. 11, 2008

(65) Prior Publication Data

US 2008/0255276 A1 Oct. 16, 2008

Related U.S. Application Data

(63) Continuation of application No. PCT/AT2006/000408, filed on Oct. 9, 2006.

(30) Foreign Application Priority Data

Oct. 11, 2005 (AT) .................. A 1652/2005

(51) Int. Cl.
| | |
|---|---|
| *C04B 16/00* | (2006.01) |
| *C04B 16/02* | (2006.01) |
| *C08L 1/00* | (2006.01) |
| *C08L 5/00* | (2006.01) |
| *C08L 89/00* | (2006.01) |
| *C08L 97/00* | (2006.01) |
| *C09D 5/00* | (2006.01) |
| *C09D 11/04* | (2006.01) |
| *C09D 17/00* | (2006.01) |
| *C09D 101/00* | (2006.01) |
| *C09D 105/00* | (2006.01) |
| *C09D 189/00* | (2006.01) |
| *C09D 197/00* | (2006.01) |
| *C09J 11/06* | (2006.01) |

(52) U.S. Cl. ............ 106/501.1; 524/35; 524/42; 524/43; 524/44; 524/45; 524/46; 524/47; 524/50; 524/51

(58) Field of Classification Search ........... 524/35, 524/42–47, 50, 51; 106/501.1
See application file for complete search history.

(56) References Cited

U.S. PATENT DOCUMENTS

| | | | | | |
|---|---|---|---|---|---|
| 2,661,349 | A | * | 12/1953 | Caldwell et al. ............... 536/63 |
| 3,741,922 | A | * | 6/1973 | Glomski et al. .................. 24/43 |
| 3,769,247 | A | | 10/1973 | Glomski et al. |
| 3,903,076 | A | * | 9/1975 | Krumel et al. ................... 536/85 |
| 3,947,287 | A | * | 3/1976 | Belde et al. .................... 106/413 |
| 3,998,973 | A | * | 12/1976 | Carlson ........................... 514/770 |
| 4,095,992 | A | * | 6/1978 | Rudolph et al. ............ 106/207.2 |
| 4,104,213 | A | * | 8/1978 | Chiang et al. .................... 524/47 |
| 4,169,854 | A | * | 10/1979 | Igoe ............................... 426/583 |
| 4,716,186 | A | | 12/1987 | Portnoy et al. |
| 4,826,970 | A | | 5/1989 | Reid et al. |
| 4,845,152 | A | * | 7/1989 | Palmer .......................... 524/734 |
| 4,992,539 | A | * | 2/1991 | Portnoy et al. ................ 536/120 |
| 5,118,732 | A | | 6/1992 | Loth et al. |
| 5,432,215 | A | * | 7/1995 | Girg et al. ........................ 524/28 |
| 5,455,341 | A | | 10/1995 | Kiesewetter et al. |
| 5,675,064 | A | * | 10/1997 | Pearlstein et al. .......... 800/320.1 |
| 5,972,093 | A | | 10/1999 | Mosca |
| 6,001,927 | A | * | 12/1999 | Billmers et al. ............... 524/732 |
| 6,359,040 | B1 | * | 3/2002 | Burdick .......................... 524/43 |
| 6,482,875 | B2 | * | 11/2002 | Lorenz et al. .................... 524/11 |
| 6,589,293 | B1 | * | 7/2003 | Guns et al. ...................... 8/94.16 |
| 2002/0045684 | A1 | * | 4/2002 | Bacher et al. ...................... 524/4 |
| 2002/0129744 | A1 | * | 9/2002 | Immordino et al. .......... 106/778 |
| 2004/0024154 | A1 | * | 2/2004 | Schinabeck et al. .......... 526/287 |
| 2005/0235878 | A1 | * | 10/2005 | Podlas ........................... 106/618 |
| 2006/0048684 | A1 | * | 3/2006 | Bonetto et al. ................ 106/772 |
| 2006/0148937 | A1 | * | 7/2006 | Bostrom et al. ................. 524/46 |
| 2006/0199742 | A1 | * | 9/2006 | Arisz et al. .................... 507/114 |
| 2006/0287519 | A1 | * | 12/2006 | Heinzman ..................... 536/105 |
| 2007/0287777 | A1 | * | 12/2007 | Kawamura et al. ............. 524/47 |
| 2008/0215026 | A1 | * | 9/2008 | Schornick et al. ............. 604/369 |
| 2008/0227892 | A1 | * | 9/2008 | van der Wielen et al. ...... 524/44 |
| 2008/0308243 | A1 | * | 12/2008 | Anderson et al. ............. 162/175 |

FOREIGN PATENT DOCUMENTS

| | | |
|---|---|---|
| DE | 2 005 591 | 8/1970 |
| DE | 42 41 289 A1 | 6/1994 |
| EP | 0 307 915 A2 | 3/1989 |
| EP | 0 601 404 A1 | 6/1994 |
| EP | 0 979 850 A1 | 2/2000 |
| EP | 1 477 535 A1 | 11/2004 |
| GB | 1 240 404 | 7/1971 |
| WO | 97/12946 A1 | 4/1997 |

OTHER PUBLICATIONS

Schoff et al. Rheological Measurments, Encyclopedia of Polymer Science and Technology, vol. 11, John Wiley and Sons, Inc. 2004, p. 473-547.*
Bieleman, Chima 56, 2002, 163-169.*
International Search Report, dated Apr. 17, 2007.
International Preliminary Report on Patentability dated Sep. 18, 2008.

\* cited by examiner

*Primary Examiner* — Liam Heincer
(74) *Attorney, Agent, or Firm* — Laurence A. Greenberg; Werner H. Stemer; Ralph E. Locher

(57) ABSTRACT

Starch(es) and starch derivatives are combined together with at least one high-viscosity cellulose as a thickener in dispersion binder-based color systems. The cellulose has a viscosity of >50,000 mPa·s, measured by the Brookfield rotation viscometer as a 2% swollen aqueous solution at 5 rpm and 25° C. A method produces dispersion binder-based color systems and a dispersion color thickener combination and a dispersion color containing the dispersion color thickener combination.

17 Claims, 2 Drawing Sheets

FIG. 3 Viscosities of dispersion paints with use of starch at EC 75,000
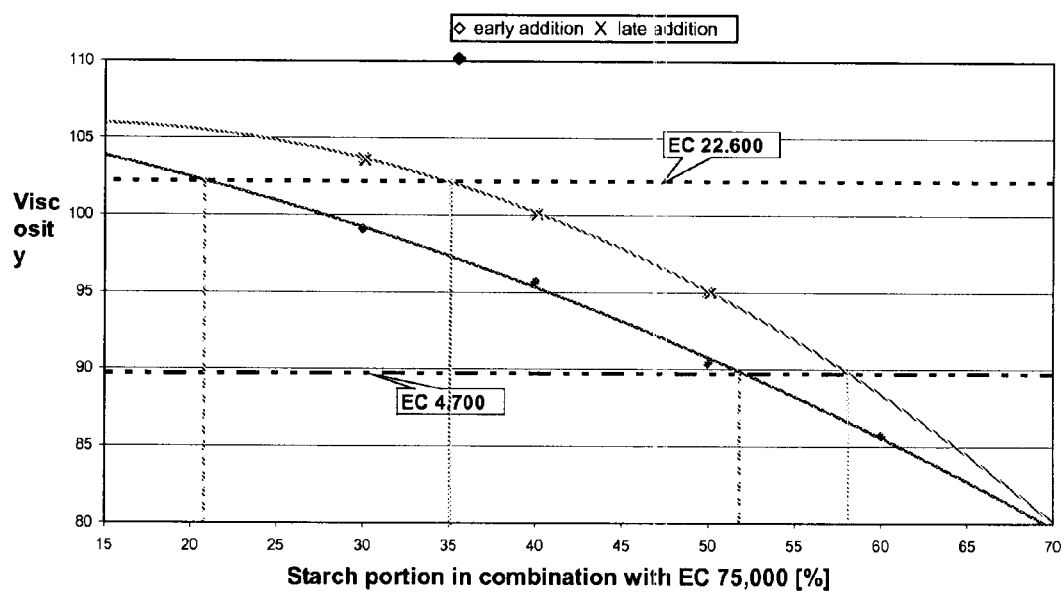

THICKENER FOR PAINT SYSTEMS

CROSS-REFERENCE TO RELATED APPLICATIONS

This is a continuation, under 35 U.S.C. §120, of copending international application No. PCT/AT2006/000408, filed Oct. 9, 2006, which designated the United States; this application also claims the priority, under 35 U.S.C. §119, of Austrian patent application No. A 1652/2005, filed Oct. 11, 2005; the prior applications are herewith incorporated by reference in their entirety.

BACKGROUND OF THE INVENTION

Field of the Invention

The present invention relates to the combined use of starches or starch derivatives with high-viscosity celluloses as thickeners in paint systems featuring surprisingly high thickener performances not to be expected, as well as dispersion paints for inside and outside use resulting therefrom.

It is known to the skilled artisan that current interior and exterior wall paints based on aqueous systems frequently contain four main components, namely fillers, pigments, binders and water, as well as a plurality of important small components such as dispersants, detergents, defoamers, film formers, retarders, preservatives, biocides, salts, acids, bases, buffers, stabilizers, water glass, silica, organic solvents, thickeners etc.

The skilled artisan also knows the most diverse differentiations or synonyms for those dispersion binder-based paints, such as dispersion paint, wall paint, interior paint, rub-fast paint, washable paint, emulsion paint, brilliant paint, super-brilliant paint, satin paint, exterior paint, facade paint, filler paint, silicate paint, single-layer paint, double-layer paint, solvent paint, construction paint, structural paint, concrete coat, resin-bonded plaster, mineral plaster, dry dispersion paint, spray paint, primer, sand paint etc.

It is further known to the skilled artisan that such interior and exterior wall paints contain, above all, cellulose derivatives as thickeners and rheology-imparting agents. These include hydroxyethyl celluloses (HEC), methyl celluloses (MC), methyl hydroxyethyl celluloses (MHEC), ethyl hydroxyethyl celluloses (EHEC), hydroxypropyl celluloses (HPC), carboxymethyl celluloses (CMC), carboxymethyl hydroxyethyl cellulose (CMHEC), aminated celluloses etc. These powder products frequently are additionally modified to be swell-retardant.

Depending on the thickening effect, distinction can be made between high-viscous, medium-viscous and low-viscous celluloses. In order to give the paint producer a benchmark for the thickener performance, viscosities of 2% solutions are frequently used for a coarse classification. A cellulose having a viscosity of about 2,000 mPa·s (and less), measured by the Brookfield rotation viscometer at 5 rpm and 25° C., thus, means a low-viscosity variant, while a product of 50,000 mPa·s (and more) represents a high-viscosity cellulose. Products having viscosities in between can be classified as medium-viscosity celluloses. This viscosity classification also allows for the comparison of differently substituted celluloses such that, for instance, even methyl celluloses and hydroxyethyl celluloses can be assessed in a comparative manner. As a rule, low-viscosity and medium-viscosity cellulose ethers are used as thickeners in dispersion paints. This will, in particular, be the case with high-quality paints. However, also high-viscosity cellulose ethers are sometimes used to adjust the rheology of paints, particularly in the case of low-quality paints.

In addition to celluloses, also other thickeners such as inorganic bentonites, synthetic polymers and copolymers based on methacryl, acryl, vinyl and PUR, as well as organic, modified materials based on guar, alginates, pectin, xanthene, tragacanth and even starch are used.

Starch and starch derivatives may additionally be used as binders in single paints, which, by definition, are paints containing no synthetic binders. International patent disclosure WO 97/12946 (corresponding to U.S. Pat. No. 5,972,093), in addition to the use of milk casein, egg proteins and egg yolks, also describes the use of potato flour and starch pastes in water-based exterior and interior wall paints. Overall, up to 30% of natural binders are used in that case. Something similar is disclosed in published, European patent application EP 1 477 535. Also there, the starch functions as a binder in single paint systems.

U.S. Pat. No. 4,716,186 relates to cold-water-soluble, granular starch derivatives and their use as thickening agents in dispersion paints. Those starch derivatives are selected from the group of granular methylated, ethylated or carboxymethylated starch materials, wherein the thickening agents are soluble by at least 90% at 25° C. Water has a medium methyl, ethyl or carboxymethyl substitution degree (SD) ranging from about 0.15 to about 1.0 of such substituents per anhydroglucose unit in the starch molecule, and a ratio of the inorganic anion content (in mass percent based on the dry mass of the starch derivative) to the methyl, ethyl or carboxyl substitution degree of about 14 or below.

Published, European patent application EP 0 979 850 discloses associative thickeners. Associative thickeners do not form networks by themselves, but lead to associations of particles already present in the fluid. They have tenside character, since they comprise both hydrophilic and hydrophobic end and side chains. They consequently form, for instance, micelles and thereby contribute to an increase in the viscosity. Moreover, they are able to associate in dispersions, e.g. water-based paints, with the latex particles present therein to and link the same by "micelle bridges".

Published, non-prosecuted German patent application DE 2 005 591 A2 finally relates to textile printing pastes formed of water, a dye, at least one polymeric organic thickening agent dissolving almost completely in water, and at least one cross-linked starch derivative swelling in cold water, yet practically insoluble in cold and/or hot water.

U.S. Pat. No. 5,118,732 relates to a rain-resistant sealing composition containing aqueous polymer dispersions, non-ionic cellulose ethers selected from the group of hydroxyethyl, hydroxyethyl methyl, hydroxypropyl methyl and hydroxypropyl celluloses, as well as optionally typical additives like fillers, pigments, softeners etc.

In published, European patent application EP 0 307 915 A2, anionic water-soluble carboxymethyl hydroxyethyl derivatives of cellulose ethers are disclosed, which are usable as thickeners in aqueous compositions such as water-based paints and which contain a hydrophobic alkyl, alpha-hydroxyalkyl or acyl modification group with 8-25 carbon atoms and, in their polymer structures, comprise mass ratios of about 0.1 to about 4%, the carboxymethyl substitution degree ranging between about 0.05 and <1.

Published, European patent application EP 0 601 404 A1 (corresponding to U.S. Pat. No. 5,455,341) relates to specific, highly substituted carboxymethyl sulfoethyl cellulose ethers (CMSECs) and a simplified and economic method for pro-} ducing such highly substituted ethers as well as their use as thickening agents in textile printing.

Published, Japanese patent application JP 03-0348971 A finally relates to a foaming water-based fire-protection paint containing an emulsion of synthetic resins, a foaming agent and a carbonizing agent as well as viscosity controllers containing cellulose derivatives and having viscosities of 10-400 Pa·s.

According to the reference titled "Starch Derivatisation" by K. F. Gotlieb and A. Capelle, Wageningen Academic Publishers, The Netherlands, 2005, p. 47, hydroxyethyl celluloses have long been used in the starch industry—apparently for wallpaper pastes—to "enhance" (cross-linked) carboxymethyl starches as thickeners in technical applications. Special applications are not mentioned, nor has any synergistic effect been expressly observed.

The basic advantage of the use of starch, modified starch and starch derivatives in technical products relates in that starch is an annually renewable natural raw material which is available at low cost and in excess and can be obtained and modified by environmentally compatible processes. That is why starch is, in fact, frequently used in technology for the most diverse purposes.

Starch derivatives are able to fulfill various functions in technical applications. Thus, starches and starch derivatives are already used as adhesives, coatings and, inter alia, rheology-imparting agents, in particular thickeners, in many applications. Depending on the respective demands and additional properties sought, starches are more or less strongly modified. If used as thickeners, etherified and/or esterified products are often employed. Such products are frequently also cross-linked. Cross-linking imparts a certain stabilization and, hence, shear stability to the product. On the other hand, the substitution is aimed to induce strong swelling and, hence, a strong water-binding potential, thus leading to products having strong thickening effects.

In dispersion paints, starch-based thickeners are hardly of importance. Although all large starch manufacturers refer to that certain products can be used in paints, none of them has yet offered their own products, much less own product ranges, for paints as opposed to paper, construction and textile applications. When solely used as rheology-imparting agents, starch products offer insufficient thickener performances to compete with celluloses. Such products have accordingly not been able to prevail on the market.

BRIEF SUMMARY OF THE INVENTION

It is accordingly an object of the invention to provide a thickener for paint systems which overcome the above-mentioned disadvantages of the prior art methods and devices of this general type.

With the foregoing and other objects in view there is provided, in accordance with the invention, a method for producing a dispersion-binder-based paint system. The method includes the step of admixing a combination of at least one starch with at least one high-viscosity cellulose to the paint system as a thickener. The cellulose has a viscosity of >50,000 mPa·s measured by a Brookfield rotation viscometer as a 2% swollen aqueous solution at 5 rpm and 25° C. Ideally the viscosity can be set to >60,000 mPa·s and even >75,000 mPa·s.

It has now been surprisingly found that the combined use of starch(es) or starch derivatives with at least one high-viscosity cellulose, wherein the cellulose has a viscosity of >50,000 mPa·s, preferably >60,000 mPa·s and, in particular, >75,000 mPa·s, measured by the Brookfield rotation viscometer as a 2% swollen aqueous solution at 5 rpm and 25° C., provides special advantages when used as a thickener in a dispersion-binder-based paint system. By the combined use according to the invention, of starch-cellulose thickeners, even starches have become competitive. Unlike pure celluloses, such paint thickener combinations almost result in identical viscosities, thus surprisingly exhibiting much higher viscosities than would have been expected on account of the large differences of the individual components. In aqueous systems, between 25 and approximately 40% of the celluloses can be replaced with starch derivatives without causing the aqueous system to loose its viscosity. In paint systems, the paint thickener combinations according to the invention are likewise able to substitute high-viscosity celluloses in portions of 0.1 to 30% and, preferably, up to 25% starch, and medium-viscosity celluloses in portions of 0.1 to 65% and, preferably, up to 50% starch.

In paint systems, between 0.05 and 1.2%, preferably 0.2-0.5%, cellulose thickeners are usually used. With the substitution provided according to the invention, of up to 65%, preferably 20-50%, of the cellulose quantity by starch, this would imply a use of starch of ~0.01-0.78%, preferably 0.1-0.25%, in the paint system.

The apparent viscosity drawbacks mentioned in the context of starches solely used as thickeners in dispersion paints result in yet another, much more essential reason for their low market acceptance, namely that of deteriorating the quality of paints. The low thickener performances of starches may by compensated for by using two to three times the amount of product, yet such elevated amounts would entail dramatically deteriorated paint qualities, in particular in terms of washing and scrub resistances.

The combined use of starches and celluloses as in accordance with the invention, and the resulting paint, however, do not exhibit any of those drawbacks. By only using combined thickener amounts usual for celluloses, no "excess" of soluble polymer and, hence, no deteriorations of the washing and scrub resistances as compared to paints formed of pure cellulose will be caused, either. An essential impediment for the use of starches in such systems has, thus, been eliminated.

The present invention further relates to a method for producing a dispersion-binder-based paint system, wherein a combination of starch(es) with at least one high-viscosity cellulose is admixed to the paint system as a thickener either dry or in solution, the cellulose having a viscosity of >50,000 mPa·s, preferably >60,000 mPa·s and, in particular, >75,000 mPa·s, measured by the Brookfield rotation viscometer as a 2% swollen aqueous solution at 5 rpm and 25° C.

Alternatively, starch(es) and at least one high-viscosity cellulose can be admixed as a thickener to the paint system separately at different times, the cellulose having a viscosity of >50,000 mPa·s, preferably >60,000 mPa·s and, in particular, >75,000 mPa·s, measured by the Brookfield rotation viscometer as a 2% swollen aqueous solution at 5 rpm and 25° C.

The celluloses used in paints are usually swell-retarded so as to enable their homogeneous stirring into water without agglomeration. This swell-retardation will break very rapidly at alkaline pH-values. As a result, such swell-retarded celluloses in dry form can only be introduced at the beginning of the production of a paint. Any subsequent addition into the paint system, in particular after the addition of pigments and fillers, would cause too rapid swelling of the cellulose and, hence, an agglomeration of the cellulose. As a rule, the cellulose is stirred into the provided water, followed by lyes or ammonia, dispersants and wetting agents, pigments, fillers, defoamers, preservatives and binders. Celluloses that are not swell-retarded can only be introduced into aqueous systems at high technological expenditures, which is why such products will hardly be met on the paint market.

The starch products may, however, also be fed to the paint system at a later time without causing any inhomogeneities. The starches used in in-house experiments can, thus, be introduced at the beginning along with the cellulose, after the fillers, or even after the binder. This provides advantages by more flexible formulations and the option to adjust the viscosity by the aid of starch at the end of the formulation. The starch of the starch-cellulose combination is admixed to the paint system preferably at the end of the paint formulation prior to the addition of the binder.

On the market, celluloses having different degrees of polymerization and different viscosities are available, with medium-viscosity products representing the main portion in the paint sector within the EU. These medium-viscosity products are, above all, used in quality paints at higher amounts of use, while high-viscosity products at low amounts of use are rather used in cheap paints. Quality paints stand out for their high viscosities, little sagging, good leveling, good washing and scrub resistances, a reduced tendency to spatter (spatter resistance) and good coverage. Cheap paints mostly show little coverage and a moderate washing and scrub resistance, a poorer resistance to sagging and a high tendency to spatter, the poorer resistance to sagging and the tendency to spatter being caused by the small amount of thickener.

By the combined use of cellulose-starch thickeners as in accordance with the invention, such medium-viscosity cellulose derivatives can be perfectly substituted even while providing, in a surprising manner, improvements in the thus resulting paints as regards some properties, such as a reduced sheen and excellent roll quality. Correspondingly, the invention provides a dispersion paint thickener combination containing starch(es) or starch derivatives along with at least one high-viscosity cellulose, the cellulose having a viscosity of >50,000 mPa·s, preferably >60,000 mPa·s and, in particular, >75,000 mPa·s, measured by the Brookfield rotation viscometer as a 2% swollen aqueous solution at 5 rpm and 25° C. Due to the possible combination of high-viscosity cellulose and starch, very high portions, i.e. up to about 60%, of starch can be introduced, with the overall amount of use corresponding to that of medium-viscosity celluloses, thus guaranteeing the good properties of quality paints. Improvements in the roll quality are, moreover, achievable. The paint thickener combination according to the invention, thus, produces paints exhibiting excellent properties both in terms of washing and scrubbing resistances and in terms of processing behavior.

The high-viscosity celluloses used according to the invention are preferably selected from the group containing hydroxyethyl cellulose (HEC), methyl cellulose (MC), methyl hydroxyethyl cellulose (MHEC), ethyl hydroxyethyl cellulose (EHEC), hydroxypropyl cellulose (HPC), carboxymethyl cellulose (CMC), cationic celluloses, and combinations thereof.

Sometimes, clients wish a thickening agent to have specific rheological properties. These can be obtained by adding special auxiliary agents and rheology-imparting agents to the thickener system. In this case, even further auxiliary agents and rheology-imparting agents such as salts, acids, bases, polyurethanes, synthetic polymers and copolymers based on acrylic and methacrylic acids, natural and semi-natural polymers based on chitosan, pectin, tragacanth, guar, alginate can be added to the starch and/or to high-viscosity cellulose of the paint thickener combination. It is exactly that combination with starch, which will provide enhanced improvements in terms of paint stability, leveling, sagging, rolling and spraying behaviors.

The paint thickener combinations described can also be used in dry dispersion paints and similar dry paint systems. The starch, due to its good solubility, offers great advantages exactly in this field of application.

Paint thickener combinations of this type are, moreover, made for use in dispersion-binder-bound paints and primers of ceiling panels and other construction materials. There, the special rheological properties of starch will take effect.

The most diverse starches and starch derivatives are suitable for use as starch-cellulose paint thickener combinations in dispersion paints. According to a preferred embodiment of the present invention, the starch or starch derivatives are based on corn starch, wheat starch, potato starch, tapioca starch, manioca starch, pea starch, rice starch, amaranth starch, rye starch, barley starch and their natural and transgenic waxy forms and natural and transgenic high-amylose forms, respectively.

Basically, starch is a natural plant product. It is formed essentially of a glucose polymer which, as a rule, constitutes a composition of two components, namely amylopectin and amylose. These are, in turn, no uniform substances, but mixtures of polymers having different molecular weights. Amylose is formed essentially of unbranched polysaccharides in which the glucose is present in an alpha-1,4-bond. Amylopectin, on the other hand, is a heavily branched glucose polymer in which the glucose units besides the alpha-1,4-bonds on the branch points are contained in 1,6-bonds.

Natural starches, as a rule, have amylose contents of from 15 to 30%. There are, however, also waxy type starches that have elevated amylopectin contents, and amylo-products having elevated amylose contents. In addition to natural and cultured natural waxy types and high-amylose types (natural hybrids or mutants), waxy starches and high-amylose starches prepared by chemical and/or physical fractionation, and waxy starches produced via genetically modified plants are available. All of these starches, either as such or in derivatized form, can basically be used in combination with high-viscosity celluloses as thickeners in dispersion paints.

In a preferred manner, these starches are modified for the combined use according to the invention, with high-viscosity celluloses as thickeners in dispersion paints. From the literature, a plurality of derivatives are known, whose preparation is amongst others well summarized in the reference titled "Starch: Chemistry and Technology", R. L. Whistler, Chapters X and XVII, 1984, and in "Modified Starches: Properties and Uses", edited by O. B. Wurzburg, Chapters 2-6 and 9-11, CRC Press, 1986. With starch derivatives, distinction is generally made between starch ethers and starch esters. Further distinction can be made between non-ionic, anionic, cationic and amphoteric as well as hydrophobic starch derivatives, which can be produced by slurry, paste, semi-dry or dry derivatization as well as derivatization in organic solvents.

The starch used according to the invention is preferably the product of an esterification or, alternatively, the product of an etherification. The subsequent derivatization options belong to the prior art.

By anionic and non-ionic modification of starch, those derivatives are embraced, in which the free hydroxyl groups of the starch are substituted by anionic or non-ionic groups. Unlike corn and waxy corn starch, potato and amylopectin potato starches have naturally bound anionic groups such that, in the proper sense, anionic starch derivatives will imply additional anionic modifications. They are, in fact, naturally chemically bound phosphate groups thereby imparting additional, specific polyelectrolytic properties to potato and amylopectin potato starches.

Basically, anionic and non-ionic derivatizations can be performed in two ways:
a) The modification is effected in a manner that an esterification of the starch will occur. Inorganic or organic, heterovalent, usually bivalent, acids or salts thereof or esters thereof or anhydrides thereof serve as modifiers. Thus, the following acids, whose enumeration is only exemplary, are inter alia suitable: o-phosphoric acid, m-phosphoric acid, polyphosphoric acid, various sulphuric acids, various silicic acids, various boric acids, acetic acid, oxalic acid, succinic acid and their derivatives, glutaric acid, adipic acid, phthalic acid, citric acid etc. Mixed esters or anhydrides can also be used. The esterification of the starch may also be effected several times so as to obtain, for instance, distarch phosphoric ester. The starch used according to the invention is preferably the product of an esterification with mono-, di- or tricarboxylic acids having alkyl chains with 1-30 carbon atoms, or a carbamate, in a particularly preferred manner acylated such as succinylated, octenylsuccinylated, dodecylsuccinylated or acetylated.
b) The modification is effected in a manner that an etherification of the starch will occur. Inorganic or organic, substituted acids or salts thereof or esters thereof serve as modifiers. In this respect, it is particularly preferred, if the starch used according to the invention is a methyl, ethyl, hydroxyethyl, hydroxypropyl, hydroxybutyl, carboxymethyl, cyanoethyl, carbamoylethylether starch or a mixture thereof. By that type of reaction, the substituents will be cleaved while forming an ether group.

Consequently, the starch is, for instance, primarily substituted, or additionally substituted by phosphate, phosphonate, sulfate, sulfonate or carboxyl groups. This is, for instance, achieved by reacting potato starch with halocarboxylic acids, chlorohydroxyalkyl sulfonates or chlorohydroxyalkyl phosphonates.

By cationic modification of starches, those derivatives are summarized, where a positive charge is introduced into the starch by substitution. Cationization processes are performed using amino, imino, ammonium, sulfonium or phosphonium groups. Methods for producing cationized starches are, for instance, described by D. B. Solareck: Cationic Starches, in the book by O. B. Wurzburg (Ed.): Modified Starches: Properties and Uses, CRC Press Inc., Boca Raton, Fla. (1986), pp. 113-130. Such cationic derivatives preferably comprise nitrogen-containing groups and, in particular, primary, secondary, tertiary and quaternary amines or sulfonium and phosphonium groups bound by ether or ester bonds. The use of cationized starches containing electropositively charged quaternary ammonium groups is preferred.

Another group is represented by amphoteric starches. These contain both anionic and cationic groups, thus offering very specific application options. In most cases, these are cationic starches that are additionally modified either by phosphate groups or by xanthate. A disclosure for the production of such products is also given by D. B. Solareck: Cationic Starches, in the book by O. B. Wurzburg (Ed.): Modified Starches: Properties and Uses, CRC Press Inc., Boca Raton, Fla. (1986), pp. 113-130.

Starches can also be modified by the aid of hydrophobing reagents. Etherified hydrophobic starches will be obtained if the hydrophobic reagents contain a halide, an epoxide, a halohydrine, a glycidyl, a carboxylic acid or a quaternary ammonium group. For esterified hydrophobic starches, the hydrophobic reagent usually contains an anhydride. Carboxymethylated starches can already be hydrophobized by the aid of a hydrophobic reagent containing an amine group. The reactions mentioned may proceed in the presence of a tenside. A hydrophobization of starch can also be affected by mixing a starch or starch derivative with a fatty acid ester. The hydrophobic starches obtained by the cited reactions are likewise suitable for use in paint systems.

Esters and ethers of starches are of great importance. A distinction is made between simple starch esters and mixed starch esters, wherein the substituent(s) of the ester(s) may be different: in the ester residue RCOO—, the residue R may be an alkyl, aryl, alkenyl, alkaryl or aralkyl residue having 1 to 17 carbon atoms, preferably 1 to 6 carbon atoms, in particular one or two carbon atoms. These products include the derivatives acetate (prepared from vinyl acetate or acetane hydride), propionate, butyrate, stearate, phthalate, succinate, oleate, maleinate, fumarate and benzoate.

Such acylated, concretely succinylated, octenylsuccinylated, dodecylsuccinylated and acetylated starches exhibit very high thickening performances in aqueous systems and, therefore, are perfectly suited for paint systems.

Etherifications, in the main, are accomplished by reactions with alkylene oxides containing 2 to 6 carbon atoms, preferably 2 to 4 carbon atoms, and, in particular, by using ethylene and propylene oxide. Methyl, carboxymethyl, cyanethyl and carbamoyl ethers may, however, also be prepared and used. In a particularly preferred manner, the starch used according to the invention is a carboxymethylated corn or potato starch preferably having a carboxymethylation degree of substitution of DS 0.01-1.0, preferably DS 0.2-0.5.

Other products contain alkylhydroxyalkyl, alkylcarboxyalkyl, hydroxyalkyl carboxymethyl and alkylhydroxy alkylcarboxymethyl derivatives.

Besides the esters and ethers, or in addition to the derivatization, the starch used according to the invention can also be cross-linked, oxidized, thermochemically degraded, dextrinated or extruded to different extents, either as such or additionally.

Cross-linking is preferably carried out by reaction with epichlorohydrine, adipic acid, phosphoroxychloride or sodium trimetaphosphate, furthermore with 1,3-dichloro-2-propanol, optionally mixed with (poly)amines, furthermore with di- or polyepoxides, aldehydes or aldehyde-releasing reagents such as, for instance, N,N'-dimethylol-N,N'-ethylene urea and mixed anhydrides of carboxylic acids with di- or tribasic acids such as, for instance, a mixed anhydride of acetane hydride with adipic acid. The latter, and numerous variants of the same, can be embraced by the expression cross-linking with adipic acid.

It will be particularly preferred if the starch used according to the invention is acetal cross-linked, either as such or additionally. In a particularly suitable manner, the starch used according to the invention is glyoxal cross-linked or propionaldehyde cross-linked, acetal cross-linking being generally feasible using acetaldehyde, propionaldehyde, butyraldehyde, and even longer-chain aldehydes. Acetal cross-linked starches can be prepared and used either in combination with a further derivatization (etherification or esterification) or even without any further modification.

The starches used for the esterification, etherification and cross-linking procedures, in addition, may be tempered (in slurry) or inhibited (dry or semi-dry reaction) via thermophysical modifications.

Special products according to the invention may be obtained via reactions of the starches and starch derivatives with the most diverse forms of glycide ethers, diglycide ethers, tri-glycide ethers, tetraglycide ethers and glycide esters. In this case, the reagents may also contain phenyl, cyclohexane, alkyl, propyleneglycol and other chemical groups. Examples include reagents like butanedioldiglycide ether, polyglycerol triglycide ether, o-cresol glycide ether, polypropylenediglycol glycide ether, t.butylphenyl glycide ether, cyclohexane-dimethanol diglycide ether, glycerol triglycide ether, neopentyl glycol diglycide ether, pentaerythrit tetraglycide ether, ethylhexyl glycide ether, hexandiol glycide ether, trimethylolpropane triglycide ether, perhydrobisphenole diglycide ether and neodecanoic acid glycide ester. The modifications mentioned can be carried out as such, in combination, or in combination with conventional esterifications, etherifications and physical or thermal treatments.

Pastes of the cross-linked starches at low cross-linking degrees exhibit very rapidly increasing viscosities, which will, however, decrease again at higher cross-linking degrees. Retrogradation is, however, very low in both cases, which is why the cross-linked starches will also be of great advantage when used in paints.

Particularly suitable are combinations of epichlorohydrine cross-linked carboxymethylated starches and epichlorohydrine cross-linked carboxymethylated and hydroxypropylated starches, cross-linking being feasible both in slurries and in pastes. Yet, also starches merely propionaldehyde cross-linked or modified in combination with the above-mentioned esterifications and etherifications will exhibit particularly good thickener performances in paint systems.

According to a preferred embodiment of the present invention, the starch(es) used according to the invention is/are starch(es) graft-polymerized or graft-copolymerized, for instance, with products from the group of polyvinyl alcohols, acrylamides, acrylic acids or monomers and polymers departing from petroleum hydrocarbons. In those cases, the starch-graft (co)polymer may preferably be present as an emulsion polymer.

As already pointed out above, the mentioned starch modifications may not only be obtained by reacting native starch, but the use of degraded forms is possible too. The degradation procedures may be realized in a mechanical, thermal, thermochemical or enzymatic manner. The starch can, thus, not only be changed structurally, but the starch products can also be made cold-water-soluble and cold-water-swellable (e.g. dextrination and extrusion).

According to a preferred embodiment, the starch, or modified starch, used according to the invention is cold-water-soluble. Cold-water-soluble starch, in particular, can be prepared with or without pregelatinization by roll-drying or drum-drying, spray-drying or spray-cooking etc. For the optimum development of the properties of the cold-water-soluble starch or starch derivatives, the degree of dissociation is of great importance. The starch and its derivatives will not show any agglomeration, dust formation and tendency to demixing during their dissociation and subsequent use and, therefore, afford an optimum processability in the practical application of a suitable dry product on paste base after stirring into water. In this respect, extrusion constitutes a special procedure. It enables modified starch to degrade to different extents by physical action while, at the same time, reacting to a cold-water-soluble or cold-water-swellable product. This technology, moreover, also allows for the direct chemical derivatization of starches in a cost-saving manner. The use of the spray-drying technology (and, in particular, spray-cooking technology) allows for the production of particularly high-viscous starches and starch derivatives which lend themselves perfectly as thickeners for paint systems.

Good swelling of the starch is necessary for the thickener effect to develop well in the paint. The addition of starch or starch derivatives, as a rule, is feasible in two different ways. Where a cooking starch is used, a concentrated starch paste must be prepared prior to its addition. To this end, the starch is stirred into water, and this starch slurry is heated to boiling, cooled down and then added to the paint system. It is only by the heat that the starch will be gelatinized and, hence, brought into a water-soluble state. Alternatively, a cold-water-soluble derivative can be introduced into the system, either predissolved or as such in powder or flake form, with the starch entering into solution without agglomeration under moderate stirring. The second variant is the preferred one, the more so as this would mean less technical expenditures for the end consumer.

The present invention further relates to a dispersion paint containing a dispersion paint thickener combination as described in detail above.

Other features which are considered as characteristic for the invention are set forth in the appended claims.

Although the invention is described herein as embodied in a thickener for paint systems, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

BRIEF DESCRIPTION OF THE SEVERAL VIEWS OF THE DRAWINGS

FIG. 3 is a diagram illustrating a thickened paint system according to the invention.

DETAILED DESCRIPTION OF THE INVENTION

Figure 1:
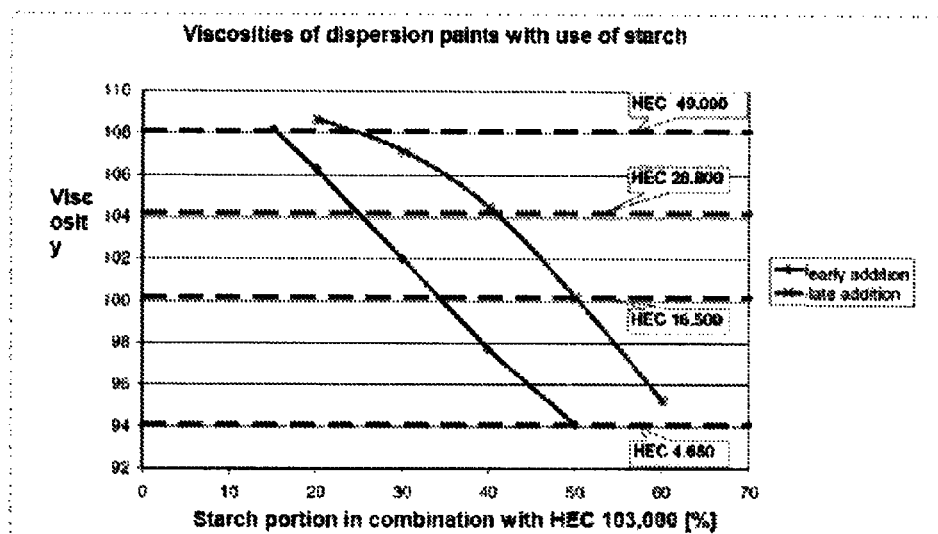
FIG. 1 is a diagram showing a comparison of the viscosities of dispersion paints.

The following examples serve to elucidate the present invention without restricting the same.

Example 1

The celluloses, starches and combinations thereof were stirred into deionized water in a 1-liter beaker at 1% in dry substance (DS) to a total of 500 g, adjusted to pH>9 with 1% NaOH, stirred for 10 min at 1500 rpm with an 80 mm (diameter) turbine stirrer, and measured by the aid of a Brookfield rotation viscometer after a swelling time of 24 h at 5 rpm and 25° C.

1.1 Comparison 1

Starch A (epichlorohydrine cross-linked carboxymethyl starch (CMS) based on potato starch; SD (CMS)~0.33).

High-viscosity HEC 103,000 (at a viscosity of 2% in DS of 103,000 mPa·s).

TABLE 1

Comparison aqueous solutions 1% in DS with HEC

| Thickener | Ratio [% mass] | Brookfield Viscosity 5 rpm, 25° C. |
| --- | --- | --- |
| High-viscosity HEC | 100 | 10,400 mPa · s |
| High-viscosity HEC/starch A | 90/10 | 10,920 mPa · s |
| High-viscosity HEC/ starch A | 75/25 | 10,120 mPa · s |

TABLE 1-continued

Comparison aqueous solutions 1% in DS with HEC

| Thickener | Ratio [% mass] | Brookfield Viscosity 5 rpm, 25° C. |
|---|---|---|
| High-viscosity HEC/starch A | 60/40 | 8,080 mPa·s |
| Starch A | 100 | 96 mPa·s |

Result: practically identical viscosity at replacement of 25% starch; almost no viscosity loss at portions of up to 40%, surprising effect based on the low viscosity of the pure starch solution.

1.2. Comparison 2

Starch A (cross-linked CMS based on KS).
High-viscosity MC 78,000 (at a viscosity of 2% in DS of 77,600 mPa·s).

TABLE 2

Comparison aqueous solutions 1% in DS with MC

| Thickener | Ratio [% mass] | Brookfield Viscosity 5 rpm, 25° C. |
|---|---|---|
| High-viscosity MC | 100 | 4,712 mPa·s |
| High-viscosity MC/starch A | 90/10 | 12,320 mPa·s |
| High-viscosity MC/starch A | 75/25 | 16,560 mPa·s |
| High-viscosity MC/starch A | 60/40 | 10,320 mPa·s |
| Starch A | 100 | 96 mPa·s |

Result: Higher viscosities when replacing 40%. Surprising effect based on the low viscosity of the pure starch solution.

Example 2

Use of Starch-Cellulose Combinations in Dispersion Paints

Formulation of interior dispersion paint by way of examples:

a) Paint I: Dispersion paint with pure cellulose thickener;
b) Paint II: Dispersion paint using starch/cellulose at a ratio of 50/50 with the
   addition of starch at the beginning of the formulation; and
c) Paint III: Dispersion paint using starch/cellulose at a ratio of 50/50 with the
   addition of starch after binder.

TABLE 3

Batch formulations for dispersion paints with and without starch addition

| Material | Description | Paint I | Paint II | Paint III |
|---|---|---|---|---|
| H₂O (deionized water) | solvent | 257.5 | 257.5 | 257.5 |
| Cellulose | thickener | 3.4 | 1.7 | 1.7 |
| Starch A | thickener | — | 1.7 | — |
| NaOH 25% | base | 0.4 | 0.4 | 0.4 |
| Coatex | wetting agent | 2.3 | 2.3 | 2.3 |
| Agitan 285 | defoamer | 1.5 | 1.5 | 1.5 |
| Preventol D7 | biocide | 1.1 | 1.1 | 1.1 |
| Kronos 2190 | pigment | 75.0 | 75.0 | 75.0 |
| Finntalc M 30 SL | filler | 52.5 | 52.5 | 52.5 |
| Omyacarb 5-GU | filler | 93.8 | 93.8 | 93.8 |
| Omyacarb 2-GU | filler | 187.5 | 187.5 | 187.5 |

TABLE 3-continued

Batch formulations for dispersion paints with and without starch addition

| Material | Description | Paint I | Paint II | Paint III |
|---|---|---|---|---|
| Acronal LR 8961 | binder | 75 | 75 | 75 |
| Starch A | thickener | — | — | 1.7 |
| Total | | 750 g | 750 g | 750 g |

Execution:

Deionized water is provided, the cellulose (paint I) or cellulose-starch combination (paint II) is stirred in for 5 min and subsequently thickened with soda lye. After this, the stirring in of the wetting agent, defoamer, biocide, pigments and fillers is affected. Following a dispersion phase of 20 min, the binder is introduced, followed by the addition of starch for paint III. After 10 minutes of stirring, the paint is stored, and the viscosity and pH are determined after 24 h.

a) Comparison of thickener performances at different use ratios of cellulose/starch and at different starch addition times, respectively.

In the following dispersion paints produced, the same total amount of thickener (cellulose, starch-cellulose combination) was always used. The ratios were, however, varied.

With the above formulation (see Table 3), different medium-viscosity hydroxyethyl celluloses (HEC) were, on the one hand, used in dispersion paints (analogous to paint formulation 1), and the thus resulting viscosities were compiled. As pointed out in the description, the medium-viscosity HECs were classified via the determination of the viscosity of 2% solutions and denoted as such.

TABLE 4

Results of the stirring in of medium-viscosity celluloses

| Medium-viscosity HEC | Paint variant I Viscosity Stormer viscometer after 24 h storage at 25° C. |
|---|---|
| HEC 4,650 | 94.1 KU |
| HEC 16,500 | 100.2 KU |
| HEC 28,800 | 104.2 KU |
| HEC 49,000 | 108.1 KU |

In a further step, dispersion paints were produced on the basis of different ratios of combination of a high-viscosity HEC (HEC 103,000) with starch, the addition of starch having taken place with the starch portions indicated below, on the one hand at the beginning (analogous to paint variant II) and, on the other hand, only at the end of the formulation (analogous to paint variant III).

TABLE 5

Results of the viscosities of cellulose/starch combinations in dispersion paints (paint formulations II and III).

| Starch portion in the combination with HEC 103,000 | Paint variant II (early Addition of starch) | Paint variant III (late addition of starch) |
|---|---|---|
| 60% starch | — | 95.3 KU |
| 50% starch | 94.1 KU | 100.2 KU |
| 40% starch | 97.7 KU | 104.5 KU |
| 30% starch | 102.0 KU | 107.2 KU |
| 20% starch | 106.3 KU | 106.3 KU |
| 15% starch | 108.2 KU | — |

FIG. 1 (diagram 1): Comparison of the viscosities of dispersion paints based on starch/high-viscosity cellulose combinations relative to the pure use of medium-viscosity cellulose.

The diagram indicates what portions of starch in combination with a high-viscosity HEC can be introduced into a paint system to achieve the thickening performances of pure medium-viscosity celluloses.

It is, thus, feasible to replace a HEC 4,650 with 50% portions of starch of a pigment thickener combination at an early addition, and with about 60% at a later addition. HEC 16,500 can be substituted by about 65% high-viscosity cellulose and a 35% portion of starch at an early addition, and by about 50% high-viscosity cellulose and 50% starch at a later addition. A HEC 28,800 viscosity in the paint corresponds to a combination with about 25% at an early, and about 40% at a later, addition. A HEC 49,000 can be replaced with portions of 15% starch at an early, and about 20% starch at a late, addition.

a) Comparison of paint properties of dispersion paints thickened with HEC and HEC/starch, respectively.

Three different paints were prepared using the interior dispersion paint formulation described in Table 3:
a) a paint (paint IV) with a HEC 49,000 thickener;
b) a paint (paint V) using a high-viscosity HEC 103,000 in combination with a starch (starch A type) at a ratio of 74/26; and
c) for comparison, a paint (paint VI) with pure high-viscosity HEC 103,000, yet only that portion which is used in the combination (0.34%).

TABLE 6

Comparison of interior dispersion paints, including application-specific tests (leveling, sagging, scrubbing, roll test)

| Interior dispersion paint | Paint IV HEC 103,000/ starch A 74/26 | Paint V HEC 49,000 | Paint VI HEC 103,000 |
|---|---|---|---|
| Partial amount of use % | 0.34/0.11 | 0.45 | 0.34 |
| Total amount of use % | 0.45 | 0.45 | 0.34 |
| Brookfield [mPa · s]; 20 rpm | 8,800 | 8.300 | 5,700 |
| Stormer viscosity [KU] | 108 | 108 | 92 |
| Leveling (Leneta; ASTM D 4062-99) | 8 | 6 | 8 |
| Sagging ASTM D4400-99 [mils] | 14 | 14 | 10 |
| Scrub class (ISO 11998) | 3 | 3 | 3 |
| Roll test* | +++ | ++ | ++ |

*subjective evaluation of rolling using roller with lamb's wool cover
very good (+++), good (++), acceptable (+), poor (−)

As is apparent from Table 6, the properties of a paint based on pure medium-viscosity HEC 49,000 (paint V) have definitely been achieved through the combined use of starch A/HEC. In addition, improvements have been demonstrated in terms of leveling (8 rather than 6 mils) and roll behavior. A comparison with a paint just produced with the portion of HEC (paint VI) used in the combination (0.34% in paint IV) does not yield the desired viscosities and also exhibits poorer sagging values and a tougher roll behavior. Thus, also improved paint properties will be achieved by the dispersion paints produced on the basis of the paint thickener combination (starch/cellulose).

a) Comparison of paint properties of dispersion paints thickened with MC and MC/starch, respectively.

With the interior dispersion paint formulation described in Example 2, two further paints were produced:

a) a paint (paint VII) with methyl cellulose (MC) 22,500; and
b) a paint (paint VIII) using a high-viscosity MC 78,000 in combination with a starch (starch B type; epichlorohydrin cross-linked carboxymethylated amylopectin potato starch; SD (CMS) ~0.33) at a ratio of 60/40.

TABLE 7

Comparison of interior dispersion paints, including application-specific tests (leveling, sagging, scrubbing, roll test).

| Interior dispersion paint | Paint VII MC 22,500 | Paint VIII MC 78,000/starch B 60/40 Late addition of starch |
|---|---|---|
| Partial amount of use % | — | 0.27/0.18 |
| Total amount of use % | 0.45 | 0.45 |
| Brookfield [mPa · s]; 20 rpm | 8,160 | 8,460 |
| Stormer viscosity [KU] | 106.6 | 106.2 |
| Leveling (Leneta; ASTM D 4062-99) | 8 | 9 |
| Sagging ASTM D4400-99 [mils] | 14 | 14 |
| Scrub class (ISO 11998) | 3 | 3 |
| Roll test* | ++ | ++ |

*subjective evaluation of rolling using roller with lamb's wool cover
very good (+++), good (++), acceptable (+), poor (−)

It is apparent from Table 7 that, in general, the properties of a paint based on pure medium-viscosity MC 22,500 (paint VII) are achieved through the combined use of starch B and MC 78,000. Improvements in terms of leveling (9 rather than 8) and roll behavior have again been demonstrated. Thus, enhanced paint properties will again be achieved with the dispersion paints produced on the basis of the paint thickener combination (starch/cellulose).

Example 3

Use of Starch-Cellulose Combinations in Dispersion Paints

Formulation of a further interior dispersion paint by way of examples with cold-water-soluble octenyl-succinylated amylopectin potato starch (starch C) and cold-water-soluble propionaldehyde cross-linked conventional potato starch (starch D):

a) Paint IX: dispersion paint with pure cellulose 16,500 thickener;
b) Paints X+XI: dispersion paint using starch/cellulose with the addition of starch after the binder.

TABLE 8

Batch formulations for dispersion paints with and without starch addition

| Material | Description | Paint IX | Paint X | Paint XI |
|---|---|---|---|---|
| H₂O (deionized water) | solvent | 377.3 | 377.3 | 377.3 |
| Cellulose HEC 16,500 | thickener | 5.0 | — | — |
| Cellulose HEC 103,000 | thickener | — | 3.0 | 3.0 |
| NaOH 25% | Base | 0.2 | 0.2 | 0.2 |
| Coatex | wetting agent | 3.5 | 3.5 | 3.5 |
| Agitan 285 | defoamer | 2 | 2 | 2 |
| Socl P2 | Filler | 150 | 150 | 150 |
| Omyacarb 5-GU | Filler | 400 | 400 | 400 |
| Mergal K15 | biocide | 2 | 2 | 2 |
| Acronal LR 8961 | binder | 60 | 60 | 60 |

TABLE 8-continued

Batch formulations for dispersion paints with and without starch addition

| Material | Description | Paint IX | Paint X | Paint XI |
|---|---|---|---|---|
| Starch C | thickener | — | 2 | — |
| Starch D | thickener | — | — | 2 |
| Total | | 1000 g | 1000 g | 1000 g |

Execution:

Deionized water is provided, the cellulose is stirred in for 5 min and subsequently thickened with soda lye. After this, the stirring in of the wetting agent, defoamer, fillers and biocide is effected. Following a dispersion phase of 10 minutes, the binder is introduced, followed by the addition of starch for paints X and XI. After 10 minutes of stirring, the paint is stored, and the viscosity and pH are determined after 24 h, and further paint examinations are made regarding the paint quality.

TABLE 9

Comparison of interior dispersion paints, including application-specific tests (levelling, sagging, scrubbing, roll test).

| | Interior dispersion paint | | |
|---|---|---|---|
| | Paint IX HEC 16,500 | Paint X HEC 103,000/ starch C 60/40 | Paint XI HEC 103,000/ starch D 60/40 |
| Partial amount of use % | — | 0.30/0.20 | 0.30/0.20 |
| Total amount of use % | 0.50 | 0.50 | 0.50 |
| Brookfield [mPa · s]; 20 rpm | 7,100 | 9,760 | 10,580 |
| Stormer viscosity [KU] | 106.3 | 115.4 | 110.2 |
| Leveling (Leneta; ASTM D 4062-99) | 4 | 4 | 4 |
| Sagging ASTM D4400-99 [mils] | 12 | 14 | 14 |
| Roll test* | ++ | +++ | +++ |

*subjective evaluation of rolling using roller with lamb's wool cover
very good (+++), good (++), acceptable (+), poor (−)

The 60/40 HEC-starch thickener combinations yield very good thickener performances over pure HEC 16,500 paints. The paint properties differ scarcely. Slight advantages over the pure HEC paint (paint IX) were observed with paints X (starch C) and paint XI (starch D) regarding the sagging and roll properties.

Example 4

Use of Starch-Cellulose Combinations in Exterior Dispersion Paints

Formulation of an exterior dispersion paint by way of examples using starches (starch A and starch B):
a) Paint XII: Dispersion paint with pure cellulose thickener (HEC 28,800); and
b) Paints XIII and XIV: Dispersion paints using starch/cellulose with the addition of starch after the binder.

TABLE 10

Batch formulations for dispersion paints with and without starch addition

| Material | Description | Paint XII | Paint XIII | Paint XIV |
|---|---|---|---|---|
| H₂O (Deionized water) | solvent | 160 | 160 | 160 |
| Cellulose HEC 28,800 | thickener | 3.4 | — | — |

TABLE 10-continued

Batch formulations for dispersion paints with and without starch addition

| Material | Description | Paint XII | Paint XIII | Paint XIV |
|---|---|---|---|---|
| Cellulose HEC 103,000 | thickener | — | 2.0 | 2.0 |
| NaOH 25% | base | 0.4 | 0.4 | 0.4 |
| Coatex | wetting agent | 1.5 | 1.5 | 1.5 |
| Agitan 315 | defoamer | 1.5 | 1.5 | 1.5 |
| Preventol D6 | biocide | 1.2 | 1.2 | 1.2 |
| Kronos 300 | pigment | 75 | 75 | 75 |
| Finntalc M 20 SL | filler | 52 | 52 | 52 |
| Omyacarb 15-GU | filler | 117 | 117 | 117 |
| Omyacarb 5-GU | filler | 113 | 113 | 113 |
| Acronal S 559 | binder | 225 | 225 | 225 |
| Starch A | thickener | — | 1.4 | — |
| Starch B | thickener | — | — | 1.4 |
| Total | | 750 g | 750 g | 750 g |

Execution:

Deionized water is provided, the cellulose is stirred in for 5 minutes and subsequently thickened with soda lye. After this, the stirring in of the wetting agent, defoamer, biocide, pigments and fillers is effected. Following a dispersion phase of 20 minutes, the binder is introduced, followed by the addition of starch for paints XIII and XIV. After 10 minutes of stirring, the paint is stored, and the viscosity and pH are determined after 24 h.

TABLE 11

Comparison of exterior dispersion paints, including application-specific tests (leveling, sagging, scrubbing, roll test).

| | Exterior dispersion paint | | |
|---|---|---|---|
| | Paint XII HEC 28,800 | Paint XIII HEC 103,000/ starch A 60/40 | Paint XIV HEC 103,000/ starch B 60/40 |
| Partial amount of use % | — | 0.27/0.18 | 0.27/0.18 |
| Total amount of use % | 0.45 | 0.45 | 0.45 |
| Brookfield [mPa · s]; 20 rpm | 6,240 | 7,340 | 7,380 |
| Stormer viscosity [KU] | 99.2 | 100.4 | 100.3 |
| Leveling (Leneta; ASTM D 4062-99) | 5 | 5 | 6 |
| Sagging ASTM D4400-99 [mils] | 10 | 12 | 10 |
| Scrub Class (ISO 11998) | 2 | 2 | 2 |
| Roll test* | ++ | +++ | +++ |

*subjective evaluation of rolling using roller with lamb's wool cover
very good (+++), good (++), acceptable (+), poor (−)

The 60/40 HEC-starch thickener combinations yield very good thickener performances over pure HEC 28,800 paints. The paint properties differ scarcely. Slight advantages over the pure HEC paint (paint XII) were observed with paint XIII (starch A) in terms of sagging, and with paint XIV (starch B) in terms of leveling, and with both of the two starch-containing paints regarding the roll properties.

Example 5

Further comparisons were made analogously to Examples 2 and 2.1, of interior paints produced, on the one hand, with celluloses, concretely methyl celluloses (MC) and ethyl celluloses (EC), and, on the other hand, with cellulose (MC, EC)-starch combinations.

Formulation of the interior dispersion paint analogous to the Examples paint I, paint II and paint III:

5.1. Comparison of Thickener Performances at Different Use Ratios of Methyl Cellulose/Starch and at Different Starch Addition Times, Respectively.

In the following dispersion paints produced, the same total amount of thickener (cellulose, starch-cellulose combination) was always used. The ratios were, however, varied.

With the formulation indicated above (see Table 3), different medium-viscosity methyl hydroxyethyl celluloses (MC) were, on the one hand, used in dispersion paints (analogous to paint formulation I), and the thus resulting viscosities were compiled. As pointed out in the description, the medium-viscosity MCs were classified via the determination of the viscosity of 2% solutions and denoted as such.

TABLE 12

Results of the stirring in of medium-viscosity celluloses

| Medium-viscosity MC | Paint variant I Stormer viscometer viscosity after 24 h storage at 25° C. |
|---|---|
| MC 4,000 | 92.0 KU |
| MC 10,000 | 99.0 KU |

In a further step, dispersion paints were produced on the basis of different ratios of combination of a high-viscosity MC (MC 138,000) with starch, the addition of starch having taken place with the starch portions indicated below, on the one hand, at the beginning (analogous to paint variant II) and, on the other hand, only at the end of the formulation (analogous to paint variant III).

Figure 2:
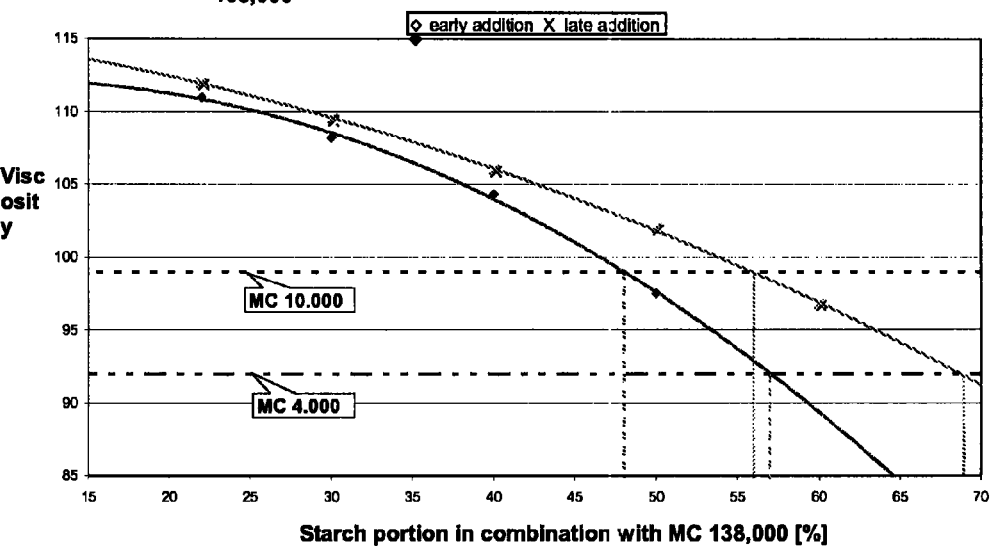
FIG. 2 is a similar diagram with the viscosities of dispersion paints.

FIG. 2 (diagram 2): Comparison of the viscosities of dispersion paints based on starch/high-viscosity MC combinations relative to the pure use of medium-viscosity MCs:

The diagram indicates what portions of starch in combination with a high-viscosity MC 138,000 can be introduced into a paint system to achieve the thickening performances of pure medium-viscosity celluloses.

It is, thus, feasible to replace an MC 4,000 with 55% portions of starch of a pigment thickener combination at an early addition, and with about 65% at a late addition. MC 10,000 can be substituted by about 55% high-viscosity MC and a 45% portion of starch at an early addition, and by about 45% high-viscosity MC and 55% starch at a late addition.

a) Comparison of thickener performances at different use ratios of ethyl hydroxyethyl cellulose/starch and at different starch addition times, respectively.

In the following dispersion paints produced, the same total amount of thickener (cellulose, starch-cellulose combination) was always used. The ratios were, however, varied.

With the formulation indicated above (see Table 3), different medium-viscosity ethyl hydroxyethyl celluloses (EC) were, on the one hand, used in dispersion paints (analogous to paint formulation 1), and the thus resulting viscosities were compiled. As pointed out in the description, the medium-viscosity MCs were classified via the determination of the viscosity of 2% solutions and denoted as such.

TABLE 14

Results of the stirring in of medium-viscosity celluloses.

| Medium-viscosity EC | Paint variant I Stormer viscometer viscosity after 24 h storage at 25° C. |
|---|---|
| EC 4,700 | 89.7 KU |
| EC 22,600 | 102.2 KU |

In a further step, dispersion paints were produced on the basis of different ratios of combination of a high-viscosity EC (EC 75,000) with starch, the addition of starch having taken place with the starch portions indicated below, on the one hand, at the beginning (analogous to paint variant II) and, on the other hand, only at the end of the formulation (analogous to paint variant III).

TABLE 15

Results of the viscosities of EC/starch A combinations in dispersion paints (paint formulations II and III).

| Starch portion starch A in the combination with EC 75,000 | Paint variant II (early addition of starch) | Paint variant III (late addition of starch) |
|---|---|---|
| 60% starch | 85.7 KU | — |
| 50% starch | 90.4 KU | 95.1 KU |
| 40% starch | 95.7 KU | 100.4 KU |
| 30% starch | 99.1 KU | 103.7 KU |

FIG. 3 (diagram 3): Comparison of the viscosities of dispersion paints based on starch/high-viscosity EC combinations relative to the pure use of medium-viscosity EC:

The diagram indicates what portions of starch in combination with a high-viscosity EC 75,000 can be introduced into a paint system to achieve the thickening performances of the pure medium-viscosity ethyl hydroxyethyl celluloses.

It is, thus, feasible to replace an EC 4,700 with 50% portions of starch of a pigment thickener combination at an early addition, and with about 55% at a late addition. The EC 22,600 can be substituted by about 80% high-viscosity EC and a 20% portion of starch at an early addition, and by about 65% high-viscosity EC and 35% starch at a late addition.

Example 6

Use of Starch-Cellulose Combinations in Dispersion Paints

Formulation of a further interior dispersion paint by way of examples, using an epichlorohydrine cross-linked carboxymethyl corn starch (starch E), a carboxymethyl potato starch (starch F), a propoxylated potato starch (G) and a cross-linked propoxylated potato starch (H):
a) Paint XV: Dispersion paint with pure HEC 4,650 thickener; and
b) Paints XVI+XVII+XVIII+XIX: Dispersion paint using starch/cellulose and the addition of the starch shortly after the cellulose.

TABLE 16

Batch formulations for dispersion paints with and without starch addition

| Material | Description | Paint XV | XVI | XVII | XVIII | XIX |
|---|---|---|---|---|---|---|
| H$_2$O (deionized water) | solvent | 343.5 | 343.5 | 343.5 | 343.5 | 343.5 |
| Cellulose HEC 4,650 | thickener | 4.5 | — | — | — | — |
| Cellulose HEC 103,000 | thickener | — | 2.7 | 2.7 | 2.7 | 2.7 |
| Starch E | thickener | — | 1.8 | — | — | — |
| Starch F | thickener | — | — | 1.8 | — | — |
| Starch G | thickener | — | — | — | 1.8 | — |
| Starch H | thickener | — | — | — | — | 1.8 |

TABLE 16-continued

Batch formulations for dispersion paints with and without starch addition

| Material | Description | Paint XV | XVI | XVII | XVIII | XIX |
|---|---|---|---|---|---|---|
| NaOH 25% | base | 0.5 | 0.5 | 0.5 | 0.5 | 0.5 |
| Coatex | wetting agent | 3.0 | 3.0 | 3.0 | 3.0 | 3.0 |
| Agitan 285 | defoamer | 2.0 | 2.0 | 2.0 | 2.0 | 2.0 |
| Kronos 2190 | pigment | 100 | 100 | 100 | 100 | 100 |
| Finntalc M 30 SL | filler | 70 | 70 | 70 | 70 | 70 |
| Omyacarb 5-GU | filler | 125 | 125 | 125 | 125 | 125 |
| Omyacarb 2-GU | filler | 250 | 250 | 250 | 250 | 250 |
| Mergal K15 | biocide | 1.5 | 1.5 | 1.5 | 1.5 | 1.5 |
| Acronal LR 8961 | binder | 100 | 100 | 100 | 100 | 100 |
| Total | | 1000 g | 1000 g | 1000 g | 1000 g | 1000 g |

Execution:

Deionized water is provided, the cellulose is stirred in for 5 minutes, the starch is stirred in for XVI to XIX and subsequently thickened with soda lye. After this, the stirring in of the wetting agent, defoamer, pigments, fillers and biocide is effected. Following a dispersion phase of 5 minutes, the binder is introduced and stirred for another 3 minutes. Subsequently, storage takes place for 24 hours, followed by viscosity measurements, pH determinations and further paint examinations regarding additional quality criteria.

TABLE 17

Comparison of interior dispersion paints, including application-specific tests (leveling, sagging, roll test).

| Interior dispersion paint | XV HEC 4.650 | XVI Starch E | XVII Starch F | XVIII Starch G | XIX Starch H |
|---|---|---|---|---|---|
| Partial amount of use % HEC 103,000/Starch | — | 2.8/1.7 | 2.8/1.7 | 2.8/1.7 | 2.8/1.7 |
| Total amount of use % | 4.5 | 4.5 | 4.5 | 4.5 | 4.5 |
| Brookfield [mPa · s]; 20 rpm | 5450 | 6850 | 6400 | 6200 | 7300 |
| Stormer viscosity [KU] | 98.5 | 100.0 | 98.2 | 96.2 | 99.4 |
| pH Wert | 9.0 | 9.1 | 9.0 | 9.0 | 9.0 |
| Leveling (Leneta; ASTM D 4062-99) | 8 | 9 | 8 | 9 | 9 |
| Sagging ASTM D4400-99 [mils] | 12 | 14 | 12 | 12 | 12 |
| Roll test* | ++ | +++ | +++ | ++ | ++ |

*subjective evaluation of rolling using roller with lamb's wool cover
very good (+++), good (++), acceptable (+), poor (−)

The 60/40 HEC-starch thickener combinations yield very good thickener performances over pure HEC 4,650 paints. The paint properties differ scarcely. Slight advantages over the pure HEC paint (paint XV) were observed with paints XVI and XVII in the roll test, as well as with XVI also in terms of sagging and leveling. By contrast, starch paints XVIII and XIX exhibited advantages in leveling over the pure HEC paint.

Example 7

Use of Starch-Cellulose Combinations in Dispersion Paints

Formulation of a further interior dispersion paint by way of examples, using a cold-water-soluble acetylated potato starch (starch 1), a cold-water-soluble octenylsuccinylated potato starch (starch J) and a cold-water-soluble potato starch (K):
a) Paint XX: Dispersion paint with pure HEC 28,800 thickener; and
b) Paints XXI+XXII+XXIII: Dispersion paint using starch/cellulose with the addition of the starch shortly after the cellulose.

TABLE 18

Batch formulations for dispersion paints with and without starch addition.

| Material | Description | Paint XX | XXI | XXII | XXIII |
|---|---|---|---|---|---|
| H$_2$O (deionized water) | solvent | 343.5 | 343.5 | 343.5 | 343.5 |
| Cellulose HEC 28.800 | thickener | 4.5 | — | — | — |
| Cellulose HEC 103.000 | thickener | — | 2.25 | 2.25 | 2.25 |
| Starch I | thickener | — | 2.25 | — | — |
| Starch J | thickener | — | — | 2.25 | — |
| Starch K | thickener | — | — | — | 2.25 |
| NaOH 25% | base | 0.5 | 0.5 | 0.5 | 0.5 |
| Coatex | wetting agent | 3.0 | 3.0 | 3.0 | 3.0 |
| Agitan 285 | defoamer | 2.0 | 2.0 | 2.0 | 2.0 |
| Kronos 2190 | pigment | 100 | 100 | 100 | 100 |
| Finntalc M 30 SL | filler | 70 | 70 | 70 | 70 |
| Omyacarb 5-GU | filler | 125 | 125 | 125 | 125 |
| Omyacarb 2-GU | filler | 250 | 250 | 250 | 250 |
| Mergal K15 | biocide | 1.5 | 1.5 | 1.5 | 1.5 |
| Acronal LR 8961 | binder | 100 | 100 | 100 | 100 |
| Total | | 1000 g | 1000 g | 1000 g | 1000 g |

Execution:

Deionized water is provided, the cellulose is stirred in for 5 min, the starch is stirred in for XXI, XXII and XXIII and subsequently thickened with soda lye. After this, the stirring in of the wetting agent, defoamer, pigments, fillers and biocide is affected. Following a dispersion phase of 5 min, the binder is introduced and stirred for another 3 minutes. Subsequently, storage takes place for 24 hours, followed by viscosity measurements, pH determinations and further paint examinations regarding additional quality criteria.

TABLE 19

Comparison of interior dispersion paints, including application-specific tests (leveling, sagging, scrub class, roll test).

| | Interior dispersion paint | | | |
|---|---|---|---|---|
| | XX HEC 28,800 | XXI Starch I | XXII Starch J | XXIII Starch K |
| Partial amount of use % HEC 103,000/Starch | — | 2.25/2.25 | 2.25/2.25 | 2.25/2.25 |
| Total amount of use % | 4.5 | 4.5 | 4.5 | 4.5 |
| Brookfield [mPa · s]; 20 rpm | 7,450 | 7,250 | 8,350 | 9,800 |
| Stormer viscosity [KU] | 104.6 | 100.9 | 104.2 | 102.7 |
| pH | 9.0 | 8.9 | 9.0 | 9.0 |
| Levelling (Leneta; ASTM D 4062-99) | 9 | 9 | 9 | 9 |
| Sagging ASTM D4400-99 [mils] | 8 | 10 | 10 | 10 |
| Scrub class (ISO 11998) | 3 | 3 | 3 | 3 |
| Roll test* | ++ | +++ | +++ | +++ |

*subjective evaluation of rolling using roller with lamb's wool cover
very good (+++), good (++), acceptable (+), poor (−)

The 50/50 HEC-starch thickener combinations yield very good thickener performances over pure HEC 28,800 paints. The paint properties differ scarcely. A welcome improvement over the pure HEC paint (paint XX) was again achieved with the starch paints as regards sagging and the roll behavior.

Example 8

Use of Starch-Cellulose Combinations in Paints Based on Water Glass/Dispersion Binder Formulation of an interior dispersion silicate paint by way of examples, using starch A (epichlorohydrine cross-linked CM potato starch):
a) Paint XXIV: Dispersion silicate paint with pure hydroxy-ethyl cellulose (HEC 12,000); and
b) Paint XXV: Dispersion paint using starch/cellulose. Addition of starch (starch A) shortly after cellulose.

TABLE 20

Batch formulations for the dispersion paints with and without starch addition.

| Material | Description | Paint XXIV | Paint XXV |
|---|---|---|---|
| H₂O (deionized water) | solvent | 320.2 | 320.2 |
| Cellulose HEC 12,000 | thickener | 2.0 | — |
| Cellulose HEC 60,000 | thickener | — | 1.0 |
| Starch A | thickener | — | 1.0 |
| Betolin V30 | xanthane | 0.8 | 0.8 |
| Sapetin D27 | wetting agent | 3.0 | 3.0 |
| Betolin Quart 25 | stabilizer | 4.0 | 4.0 |
| Kronos 2190 | pigment | 65 | 65 |
| Agitan 280 | defoamer | 2 | 2 |
| Omyacarb 5-GU | filler | 200 | 200 |
| Omyacarb 2-GU | filler | 100 | 100 |
| Finntalc M30SL | filler | 65 | 65 |
| Acronal S559 | binder | 70 | 70 |
| Betolin P35 | water glass | 160 | 160 |
| Betolin A11 | viscosity stabilizer | 8 | 8 |
| Total | | 1000 g | 1000 g |

Execution:
Deionized water is provided, the cellulose is stirred in for 5 minutes, the starch is also stirred in for XXV, followed by the addition of Betolin V30. After this, Sapetin D27 and Quart 25 are added, and the batch is homogenized. Subsequently, Kronos 2190, the defoamer and the fillers are added. Following a short dispersion phase (5 minutes), the dispersion binder, water glass and viscosity stabilizer are introduced and homogenized for 5 minutes. Subsequently, storage takes place for 24 hours, followed by viscosity measurements, pH determinations and further viscosity measurements after storage at 50° C., as well as a roll test.

TABLE 21

Comparison of interior dispersion silicate paints, viscosity development over a month at RT and 50° C., respectively.

| | Interior dispersion silicate paint | | | |
|---|---|---|---|---|
| | Paint XXIV HEC 12,000 | | Paint XXV HEC 60,000/ starch A 50/50 | |
| Brookfield [mPa · s]; 20 rpm 24 h | 3,000 | | 2,950 | |
| Roll test* | ++ | | +++ | |
| Storage | RT | 50° C. | RT | 50° C. |
| Brookfield [mPa · s]; 20 rpm; 14 d | 4,800 | 8,750 | 4,950 | 8,700 |
| Brookfield [mPa · s]; 20 rpm; 28 d | 8,650 | 9,350 | 9,300 | 9,150 |
| PH | 11.2 | | 11.2 | |

*subjective evaluation of rolling using roller with lamb's wool cover
very good (+++), good (++), acceptable (+), poor (−)

The paints thickened both with pure HEC 12,000 and with the HEC 60,000/starch A combination exhibit very similar viscosities and viscosity developments at extended storage. 50% starch can be introduced into this combination without suffering viscosity losses.

Example 9

Use of Starch-Cellulose Combinations in Textured Plaster Based on Water Glass/Dispersion Binder Formulation of a silicate textured plaster by way of examples, using starch A (epichlorohydrine cross-linked CM potato starch):
a) Plaster XXVI: Silicate textured plaster with pure hydroxy ethyl cellulose (HEC 12,000)
b) Plaster XXVII: Silicate textured plaster using starch/cellulose
Addition of starch (starch A) shortly after cellulose

TABLE 22

Batch formulations for the silicate textured plasters with and without starch addition.

| Material | Description | Plaster XXVI | Plaster XXVII |
|---|---|---|---|
| H₂O (deionized water) | solvent | 104.2 | 104.2 |
| Cellulose HEC 12,000 | thickener | 2.0 | — |
| Cellulose HEC 60,000 | thickener | — | 1.0 |
| Starch A | thickener | — | 1.0 |
| Betolin V30 | xanthane | 0.8 | 0.8 |
| Sapetin D27 | wetting agent | 3.0 | 3.0 |
| Betolin Quart 25 | stabilizer | 2.0 | 2.0 |
| Kronos 2190 | pigment | 30 | 30 |
| Agitan 280 | defoamer | 2 | 2 |
| Carolith 0-0.2 mm | granulate | 210 | 210 |
| Carolith 0.2-0.5 mm | granulate | 180 | 180 |
| Carolith 0.5-1 mm | granulate | 110 | 110 |
| Carolith 1.5-2 mm | granulate | 50 | 50 |
| Carolith 2.5-3 mm | granulate | 70 | 70 |
| Finntalc M30SL | filler | 65 | 65 |
| Acronal S559 | binder | 85 | 85 |
| Betolin P35 | water glass | 70 | 70 |
| Betolin A11 | viscosity stabilizer | 8 | 8 |
| Betolin AH 250 | hydrophobing agent | 8 | 8 |
| Total | | 1000 g | 1000 g |

Execution:
Deionized water is provided, the cellulose is stirred in for 5 minutes, the starch is also stirred in for XXVII, followed by the addition of Betolin V30. After this, Sapetin D27 is added, and the batch is homogenized. Then follow the addition of Kronos 2190 and Quart 25 and a further 5-minute stirring step. After the addition of the defoamer, fillers and two finer granulates, the batch is again homogenized. After this, half of the dispersion binder, the water glass and the viscosity stabilizer are added. Following a short dispersion phase, the remaining granulates, the second partial amount of the dispersion and the hydrophobing agent are added. Then follow immediate measurements of the viscosity and the spreading index as well as an evaluation of the mounting behavior.

TABLE 23

Comparison of textured silicate plasters, viscosities, spreading index, mounting behavior and pH values.

| | Textured silicate plaster | |
| --- | --- | --- |
| | Plaster XXVI HEC 12,000 | Plaster XXVII HEC 60,000/starch A 50/50 |
| Brookfield [mPa · s]; 20 rpm immediately | 50,000 | 50,000 |
| Spreading index [cm] immediately | 20.3 | 20.9 |
| Mounting behavior* | ++ | +++ |
| Brookfield [mPa · s]; 20 rpm 24 h | 70,000 | 75,000 |
| Spreading index [cm] 24 h | 20.2 | 20.3 |
| pH | 11.2 | 11.2 |

*subjective evaluation of spreading behavior
very good (+++), good (++), acceptable (+), poor (−)

The textured plasters thickened both with pure HEC 10,000 and with the HEC 60,000/starch A combination exhibit very similar viscosities, spreading index values. The mounting behavior of the starch plaster could be enhanced by the starch.

Example 10

Use of Starch-Cellulose Combinations in a 1.5-2 mm Resin Plaster

Formulation of a dispersion-binder-based resin plaster by way of examples, using starch A (epichlorohydrine cross-linked CM potato starch):

a) Plaster XXVIII: Resin plaster with pure hydroxyethyl cellulose (HEC 12,000).

b) Plaster XXIX: Resin plaster using starch/cellulose. Addition of starch (starch A) shortly after cellulose.

TABLE 24

Batch formulations for the resin plasters with and without starch addition.

| Material | Description | Plaster XXVIII | Plaster XXIX |
| --- | --- | --- | --- |
| H$_2$O (deionized water) | solvent | 63.3 | 63.3 |
| Cellulose HEC 12,000 | thickener | 1 | — |
| Cellulose HEC 60,000 | thickener | — | 0.5 |
| Starch A | thickener | — | 0.5 |
| NaOH (25% ig) | base | 3 | 3.0 |
| Sapetin D25 | wetting agent | 1 | 1 |
| Kronos 2190 | pigment | 20 | 20 |
| Finntalc M30SL | filler | 60 | 60 |
| Omyacarb 10GU | filler | 220 | 220 |
| Nopco 8034 | defoamer | 1.7 | 1.7 |
| Mergal K15 | preservation | 1.0 | 1.0 |
| Carolith 0-0.2 mm | granulate | 80 | 80 |
| Carolith 1-1.5 mm | granulate | 186 | 186 |
| Carolith 1.5-2 mm | granulate | 263 | 263 |
| Acronal S559 | binder | 100 | 100 |
| Total | | 1000 g | 1000 g |

Execution:

Deionized water is provided, the cellulose is stirred in for 5 minutes, the starch is stirred in for XXIX and subsequently thickened with soda lye. After this, the stirring in of the wetting agent, defoamer, pigments, fillers, biocide and half of the binder is affected. Following a dispersion phase of 5 minutes, the granulates and the residual binder are introduced and stirred for another 3 minutes. Then follow immediate measurements of the viscosity, the spreading index and an evaluation of the mounting behavior as well as measurements of the viscosity and of the spreading index after 24 hours.

TABLE 25

Comparison of resin plasters, viscosities, spreading index, mounting behavior and pH values.

| | Dispersion-bound resin plaster | |
| --- | --- | --- |
| | Plaster XXVIII HEC 12,000 | Plaster XXIX HEC 60,000/starch A 50/50 |
| Brookfield [mPa · s]; 20 rpm immediately | 130,000 | 140,000 |
| Spreading index [cm] immediately | 17.0 | 16.9 |
| Mounting behavior* | + | ++ |
| Brookfield [mPa · s]; 20 rpm 24 h | 200,000 | 220,000 |
| Spreading index [cm] 24 h | 17.1 | 16.9 |
| PH | 9.0 | 9.0 |

*subjective evaluation of spreading behavior
very good (+++), good (++), acceptable (+), poor (−)

The textured plasters thickened both with pure HEC 12,000 and with the HEC 60,000/starch A combination exhibit very similar viscosities and spreading index values. 50% starch can be introduced into this combination without suffering viscosity losses. The plaster admixed with starch again shows a very good mounting behavior.

The invention claimed is:

1. A method for producing a dispersion-binder-based paint system, which comprises the step of:
   admixing a combination of at least one starch derivative with at least one high-viscosity cellulose to the paint system as a thickener, the cellulose having a viscosity of >50,000 m Pa·s measured by a Brookfield rotation viscometer as a 2% swollen aqueous solution at 5 rpm and 25° C., wherein said starch derivative is cross-linked and said starch derivative is cold-water-soluble;
   wherein the system does not comprise polymers and copolymers based on acrylic and methacrylic acids as rheology-imparting agents.

2. The method according to claim 1, which further comprises setting the viscosity of the cellulose to >60,000 mPa·s before performing the admixing step.

3. The method according to claim 1, which further comprises setting the viscosity of the cellulose to >75,000 mPa·s before performing the admixing step.

4. A method for producing a dispersion-binder-based paint system, which comprises the step of:
   admixing a combination of at least one starch derivative and at least one high-viscosity cellulose to the paint system as a thickener separately at different times, the cellulose having a viscosity of >50,000 mPa·s measured by the Brookfield rotation viscometer as a 2% swollen aqueous solution at 5 rpm and 25° C., wherein said starch derivative is cross-linked and said starch derivative is cold-water-soluble;

wherein the system does not comprise polymers and copolymers based on acrylic and methacrylic acids as rheology-imparting agents.

5. The method according to claim 4, which further comprises setting the viscosity of the cellulose to >60,000 mPa·s before performing the admixing step.

6. The method according to claim 4, which further comprises setting the viscosity of the cellulose to >75,000 mPa·s before performing the admixing step.

7. The method according to claim 4, which further comprises admixing the starch of the starch-cellulose combination to the paint system prior to an addition of a binder.

8. A dispersion paint thickener combination, comprising:
a starch derivative being a product of an esterification, said starch derivative being cross-linked and cold-water-soluble; and
at least one high-viscosity cellulose, said cellulose having a viscosity of >50,000 mPa·s measured by the Brookfield rotation viscometer as a 2% swollen aqueous solution at 5 rpm and 25° C.;
wherein the combination does not comprise polymers and copolymers based on acrylic and methacrylic acids as rheology-imparting agents.

9. The dispersion paint thickener combination according to claim 8, wherein said viscosity is >60,000 mPa·s.

10. The dispersion paint thickener combination according to claim 8, wherein said viscosity is >75,000 mPa·s.

11. The dispersion paint thickener combination according to claim 8, wherein said high-viscosity cellulose is selected from the group consisting of hydroxyethyl cellulose (HEC), methyl cellulose (MC), methyl hydroxyethyl cellulose (MHEC), ethyl hydroxyethyl cellulose (EHEC), hydroxypropyl cellulose (HPC), carboxymethyl cellulose (CMC), cationic celluloses and combinations thereof.

12. The dispersion paint thickener combination according to claim 8, wherein said starch derivative is based on at least one of corn starch, wheat starch, potato starch, tapioca starch, manioca starch, pea starch, rice starch, amaranth starch, rye starch, barley starch and their natural and transgenic waxy forms and natural and transgenic high-amylose forms, respectively.

13. The dispersion paint thickener combination according to claim 8, wherein said starch derivative is a product of said esterification with mono-, di- or tricarboxylic acids having alkyl chains with 1-30 carbon atoms, or a carbamate.

14. The dispersion paint thickener combination according to claim 13, wherein said starch derivative is acylated.

15. The dispersion paint thickener combination according to claim 13, wherein said starch derivative is selected from the group consisting of succinylated, octenylsuccinylated, dodecylsuccinylated and acetylated.

16. A dispersion paint thickener combination, comprising:
a starch derivative being cross-linked and cold-water-soluble; and
at least one high-viscosity cellulose, said cellulose having a viscosity of >50,000 mPa·s measured by the Brookfield rotation viscometer as a 2% swollen aqueous solution at 5 rpm and 25° C.;
wherein the combination does not comprise polymers and copolymers based on acrylic and methacrylic acids as rheology-imparting agents, and said starch derivative is one of a graft-polymerized starch and a graft-copolymerized starch.

17. A dispersion paint, comprising:
a dispersion paint thickener containing:
a starch derivative being cross-linked cold-water-soluble; and
at least one high-viscosity cellulose, said cellulose having a viscosity of >50,000 mPa·s measured by the Brookfield rotation viscometer as a 2% swollen aqueous solution at 5 rpm and 25° C.;
wherein the paint does not comprise polymers and copolymers based on acrylic and methacrylic acids as rheology-imparting agents.

* * * * *